(12) United States Patent
Berthaud

(10) Patent No.: US 7,932,893 B1
(45) Date of Patent: Apr. 26, 2011

(54) WATCH INCLUDING A CONTACTLESS CONTROL DEVICE FOR A COMPUTER CURSOR

(75) Inventor: Christophe Berthaud, Evilard (CH)

(73) Assignee: Swatch AG, Biel (CH)

( * ) Notice: Subject to any disclaimer, the term of this patent is extended or adjusted under 35 U.S.C. 154(b) by 2652 days.

(21) Appl. No.: 09/631,413

(22) Filed: Aug. 3, 2000

(30) Foreign Application Priority Data

Aug. 25, 1999 (EP) .................................... 99116617

(51) Int. Cl.
*G06F 3/033* (2006.01)
*G09G 5/08* (2006.01)

(52) U.S. Cl. ...................... 345/157; 345/168; 178/18.06; 368/69; 368/224; 368/230; 710/3

(58) Field of Classification Search .................. 345/173, 345/158, 157, 168; 341/22; 178/18.06; 368/281, 368/80, 69, 224, 230; 710/3; 968/247, 895
See application file for complete search history.

(56) References Cited

U.S. PATENT DOCUMENTS

| | | | | |
|---|---|---|---|---|
| 5,311,487 A | * | 5/1994 | Mininni et al. | 368/230 |
| 5,365,497 A | * | 11/1994 | Born | 368/230 |
| 5,481,265 A | | 1/1996 | Russell | |
| 5,481,506 A | * | 1/1996 | Kita | 368/10 |
| 5,543,588 A | * | 8/1996 | Bisset et al. | 178/18.06 |
| 5,559,761 A | * | 9/1996 | Frenkel et al. | 368/69 |
| 5,638,092 A | | 6/1997 | Eng et al. | |
| 5,691,747 A | * | 11/1997 | Amano | 345/167 |
| 5,729,220 A | | 3/1998 | Russell | |
| 5,832,296 A | * | 11/1998 | Wang et al. | 710/3 |
| 6,052,339 A | * | 4/2000 | Frenkel et al. | 368/230 |
| 6,137,479 A | * | 10/2000 | Olsen et al. | 345/169 |
| 6,144,366 A | * | 11/2000 | Numazaki et al. | 345/156 |
| 6,184,871 B1 | * | 2/2001 | Teres et al. | 178/18.06 |
| 6,211,860 B1 | * | 4/2001 | Bunsen | 345/157 |
| 6,359,838 B1 | * | 3/2002 | Taylor | 368/13 |
| 6,392,636 B1 | * | 5/2002 | Ferrari et al. | 345/157 |
| 6,477,117 B1 | * | 11/2002 | Narayanaswami et al. | 368/251 |
| 6,525,997 B1 | * | 2/2003 | Narayanaswami et al. | 368/223 |
| 6,556,222 B1 | * | 4/2003 | Narayanaswami | 345/786 |
| 2002/0027547 A1 | * | 3/2002 | Kamijo et al. | 345/157 |

FOREIGN PATENT DOCUMENTS

| | | |
|---|---|---|
| EP | 0 782 336 A1 | 7/1997 |
| EP | 0 789 320 A2 | 8/1997 |
| EP | 0 838 737 A1 | 4/1998 |
| EP | 1 101 5401 | 1/1999 |
| WO | 96/34333 | 10/1996 |

OTHER PUBLICATIONS

Illustrated Professional Dictionary of Horology I+II p. 1123 (2002).

* cited by examiner

*Primary Examiner* — Jin-Cheng Wang
(74) *Attorney, Agent, or Firm* — Griffin & Szipl, P.C.

(57) ABSTRACT

Watch (1) including time display means (8; 10) covered by a crystal (4). This watch includes an interface device for controlling a computer cursor. It forms a contactless watch-mouse. For this purpose, a plurality of touch sensitive sensors are arranged so that their sensitive pads (16) are supported at least partially by the crystal (4). The sensitive pads are arranged in particular in the shape of a matrix extending over most of the crystal (4). The click function is performed using a push-button (14) associated with electric contactor or by a pressure sensor or by a touch sensitive sensor provided for this purpose.

19 Claims, 3 Drawing Sheets

WATCH INCLUDING A CONTACTLESS CONTROL DEVICE FOR A COMPUTER CURSOR

This application claims priority from European Patent Application No. 99116617.4, filed Aug. 25, 1999.

FIELD OF THE INVENTION

The present invention relates to a watch associated with a control device for a computer cursor. In other words, the present invention proposes integrating in a watch a device which is equivalent to a contactless computer mouse, i.e. without any cabled communication between the watch and the computer. Such communication is known to those skilled in the art who may, in particular, use communication via electromagnetic waves, ultrasound or infrared waves.

BACKGROUND OF THE INVENTION

A portable contactless interface device used as a computer mouse is known from International Patent No. WO 96/34333. In its preferred described embodiment, this document proposes integrating this interface device between a user and the computer in a ring. In its top portion, the ring includes a first protruding part forming a housing for an electronic circuit and including at its surface a directional antenna. In the front lateral portion there is a second protruding part in which is arranged a two dimensional force sensor used to actuate a computer cursor. Moreover, another force sensor is provided in the bottom portion to select objects on the screen or to carry out commands relating to these objects. Such an action is referred to hereinafter as a "click". With reference to FIGS. 2 and 3 and the corresponding description of this document, it is clear that the sensor provided for moving the computer cursor is formed by a two dimensional force sensor actuated by the user's thumb. This force sensor allows the cursor to be moved along two perpendicular directions shown in FIG. 2. The force sensor thus determines in which of the four directions given in FIG. 2 the thumb force is exerted in the plane of the sensor. It will be noted that such a force sensor for actuating a cursor firstly limits the precision of the cursor's movement and it is not easy to use given that the ring undergoes movement on the finger, the skin of the finger experiencing relatively significant movements. Thus, a mechanical stress is exerted on the finger and the ring moves when a force is applied by the thumb in one of directions of the sensor plane. It is thus clear that control of the cursor is hampered by these movements of the ring and that this is also uncomfortable for the user.

As an alternative, which may be envisaged, International Patent No. WO 96/34333 mentions that it is possible to arrange adjacent sensors on the ring in place of the two dimensional force sensor so that the direction of movement of the cursor is determined by the sequential actuation of the adjacent sensors. This unclear and largely insufficient teaching does not enable those skilled in the art to understand how to make these adjacent sensors and how to use them to control a computer cursor properly. Moreover, the small dimensions of the ring shown in this document seem greatly to compromise such an embodiment. Those skilled in the art may find in U.S. Pat. No. 5,481,265 a similar device wherein a member is provided which can be actuated by the thumb to control a computer cursor along two orthogonal directions. This member includes four independent regions forming four adjacent force sensors which may be actuated in succession by the thumb to move the cursor up, to the right, down or to the left.

According to a variant, these four pressure sensors allow the cursor to be moved to one of the four corners of the computer screen (see FIGS. 7a and 12). This device is not at all easy to use given the position required for the thumb. Moreover, the selective application of a force on the four aforementioned pressure sensors is not easy, and is even impaired. Thus, control of the cursor's movement is approximate and in any case limited as is clear from the description of U.S. Pat. No. 5,481,265.

SUMMARY OF THE INVENTION

The present invention proposes overcoming the drawbacks mentioned relative to the two documents cited above by providing a watch-mouse as defined in accordance with a first embodiment, wherein a watch is provided that includes display means for at least one item of time related data and having an at least partially transparent outer element covering the display means or forming an outer portion of these display means, the watch including first control means for controlling the movement of a cursor on a computer screen, wherein the first control means is formed of a plurality of touch sensitive sensors whose respective sensitive pads are supported at least partially by the outer element. In accordance with a second embodiment of the invention, the first embodiment is modified so that the first means includes an analogue display protected by the outer element, which defines the watch crystal, and the sensitive pads are at least partially superposed with the analogue display. In accordance with a third embodiment of the invention, the first embodiment or the second embodiment is further modified so that the set of the sensitive pads of the touch sensitive sensors forming the first means is supported by the outer element. In accordance with a fourth embodiment of the present invention, the first embodiment or the second embodiment is further modified so that a part of the sensitive pads of the touch sensitive sensors is arranged in the top portion of the case of the watch surrounding the outer element. In accordance with a fifth embodiment of the invention, the first embodiment is modified so that the respective sensitive pads of the plurality of touch sensitive sensors are arranged in the shape of a matrix defining lines and columns, which extend over most of the outer element.

In accordance with a sixth embodiment of the invention, the fifth embodiment is further modified so that it further includes means for detecting the speed of a user's finger over the outer element or the actuation frequency of successive sensors. In accordance with a seventh embodiment of the present invention, the sixth embodiment is further modified so that the ratio between the movement of the cursor and the path taken by a user's finger across the outer element is less at low speed or actuation frequency than at relatively high speed or actuation frequency. In accordance with an eighth embodiment of the present invention, the fifth embodiment is further modified so that the movement of the cursor over the computer screen substantially corresponds to the path taken by the user's finger over the outer element.

In accordance with a ninth embodiment of the present invention, the first embodiment is modified so that the sensitive pads are arranged in concentric zones, and the direction of movement of the cursor is determined by the orientation of the pad or pads actuated relative to the centre of the concentric zones. In accordance with a tenth embodiment of the present invention, the ninth embodiment is further modified so that the speed of movement of the cursor depends on the concentric zone actuated or on two adjacent concentric zones that are actuated simultaneously.

In accordance with an eleventh embodiment of the invention, the first embodiment is modified so that it further includes second control means for selecting an object shown on the screen or carrying out a command relating to the object. In accordance with a twelfth embodiment of the present invention, the eleventh embodiment is further modified so that the second control means are arranged in the top portion of the case substantially in the 6 o'clock position. In accordance with a thirteenth embodiment of the present invention, the eleventh embodiment is further modified so that the second control means are also formed by a touch sensitive sensor. In accordance with a fourteenth embodiment of the present invention, the eleventh embodiment is further modified so that the second control means are formed by a push-button associated with an electric contactor. In accordance with a fifteenth embodiment of the present invention, the eleventh embodiment is further modified so that the second control means are arranged in a link of the wristband of the watch or in a portion of the wristband of the watch.

In accordance with a sixteenth embodiment of the invention, the eleventh embodiment is further modified so that the second control means are formed by the outer element associated with a pressure sensor, wherein the selection of an object, or the command relating to the object, is performed by applying pressure onto the outer element. In accordance with a seventeenth embodiment of the present invention, the sixteenth embodiment is further modified so that the pressure sensor is formed by a piezoelectric crystal arranged on the periphery of the outer element. In accordance with an eighteenth embodiment of the present invention, the eleventh embodiment is further modified so that the second control means are formed by the outer element associated with at least one micro-contactor or small travel contactor.

A watch is an object that is worn on the wrist and may have a relatively large surface area in a conventional embodiment. Generally, most of the top surface of a watch is occupied by the display means. The present invention is characterised in that the outer element forming the crystal protecting the display means or an outer portion of a display cell, in particular an LCD display, is used as support means for the touch sensitive pads, which allow a computer cursor to be controlled easily and precisely.

Moreover, various means are provided allowing one or more clicks to be made to select an object shown on the computer screen or to carry out a command relating to such an object. In order to do this, a conventional push-button is used arranged either in a lateral portion of the case, or in the top portion surrounding the watch crystal.

Thus, the watch according to the invention acts as interface for moving a computer cursor and carrying out various commands while keeping a conventional shape and a conventional aesthetic appearance. This latter aspect is not an indispensable feature of the present invention but contributes to demonstrating that the present solution is particularly advantageous compared to the embodiments of the prior art discussed above. The watch-mouse according to the invention may be worn all day long without the computer control linked function having any effect on the aesthetic appearance and the conventional dimensions of the watch.

As a result of the present invention, a user has available a portable contactless control interface, which has a relatively large sensitive zone for his finger. Touch sensitive sensors, in particular capacitive or resistive sensors, unlike force sensors, do not require the application of relatively significant pressure. Consequently, the mechanical stress exerted on the watch is negligible and this watch does not undergo any significant movement on the user's arm. Thus, it is easy to use and allows precise and efficient control of a computer cursor.

BRIEF DESCRIPTION OF THE DRAWINGS

Other advantages of the present invention will also become clear from the following description of various embodiments, given by way of non-limiting example, which are shown on the annexed drawings in which.

DETAILED DESCRIPTION OF THE INVENTION

Figure 1:
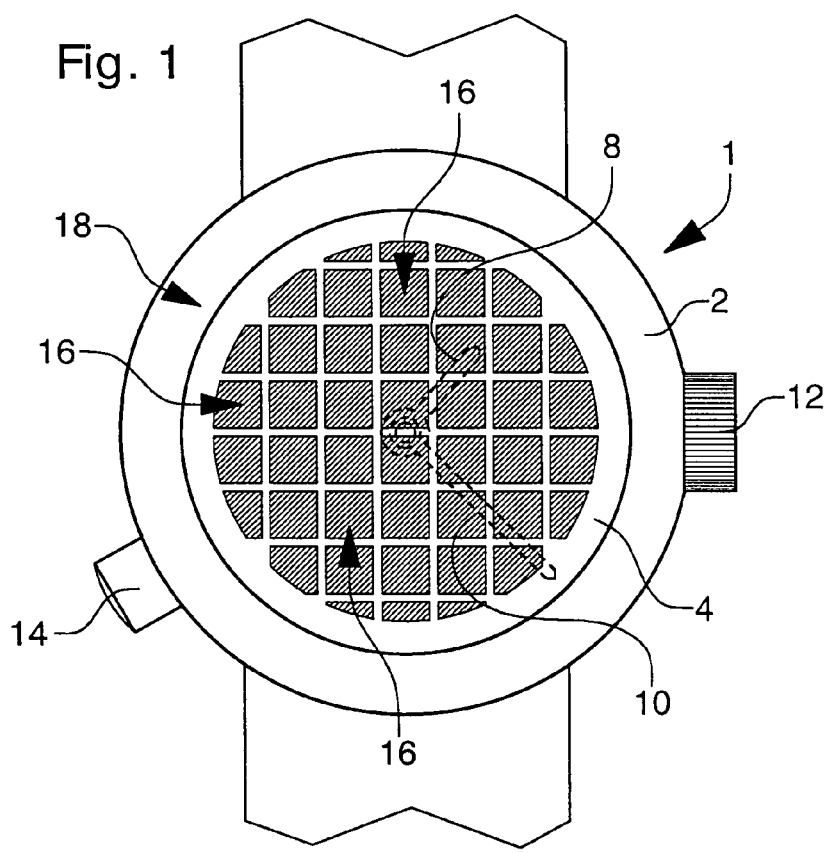
FIG. 1 is a schematic top view of a first embodiment of the invention.

FIG. 1 shows a watch 1 including a case 2 and a crystal 4 covering an analogue display comprising two hands 8 and 10 shown in dotted lines. Next, watch 1 includes a crown 12 and a push-button 14 approximately located between 7 and 8 o'clock.

According to the invention, watch 1 includes means for controlling the movement of a computer cursor formed by a set of touch sensitive sensors whose sensitive pads 16 are carried by crystal 4. More precisely, in the present embodiment, the touch sensitive sensors are of the capacitive type and sensitive pads 16 are formed by electrodes deposited underneath crystal 4 (see FIG. 7). Each electrode is electrically connected to an electronic unit for processing the received signals, in particular using contact pads located on the periphery of crystal 4, and connected to this electronic unit by a connector formed of a succession of alternately conducting and insulating sections. Those skilled in the art know how to form transparent electrodes at the surface of a glass and how to connect a plurality of capacitive touch sensitive sensors to an electronic unit (not shown) located inside watch 1. As crystal 4 occupies most of the top surface of case 2, the sensitive zone for actuating a computer cursor is relatively large without the conventional dimensions of a watch being modified, nor the external appearance nor the time display in analogue form. It will be noted however that the invention also applies to a digital time display. In this latter case, sensitive pads 16 of the capacitive sensors are arranged either on a protective glass covering the LCD cell, or at least partially on the top portion of the LCD cell.

The set of sensitive pads 16 is supported by crystal 4 and these pads extend over most of the crystal. In an alternative embodiment, part of the sensitive pads of the touch sensitive sensors may be located on the bezel or top portion 18 of case 2.

Sensitive pads 16 define the touch-sensitive zone of the watch for actuating the movement of a computer cursor. In FIG. 1, these sensitive pads 16 are arranged in the shape of a matrix defining substantially square pad lines and columns.

In a first cursor control variant, it is possible to determine the set of sensitive pads actuated when a finger passes over crystal 4. Then, via a known method, in particular that of least squares, a corresponding direction of movement is defined for the cursor. Moreover, the speed at which the successive sensitive pads are actuated allows a speed of movement to be determined for the cursor, which is for example proportional to the speed of movement of the finger over the crystal. By differentiating the level of actuation of each touch sensitive sensor, it is possible to perform a weighting in the linear regression suggested hereinbefore. Moreover, it is possible to decompose the movement of the finger by performing a linear regression by sector or region of the touch-sensitive zone.

According to a second cursor control variant, the path of the finger across crystal 4 is traced and a cursor movement corresponding to this path is reproduced with a given amplification factor. In order to do this, one can, in particular, select the sensitive pads actuated above a certain threshold or only retain in each predetermined time period the touch sensitive sensor having the maximum level of actuation or the centre of gravity of the sensors all having substantially such a maximum level. One may thus determine with a given frequency the successive positions of a finger over crystal 4. Moreover, it is then easy to determine a speed of movement of the finger.

Figure 2:
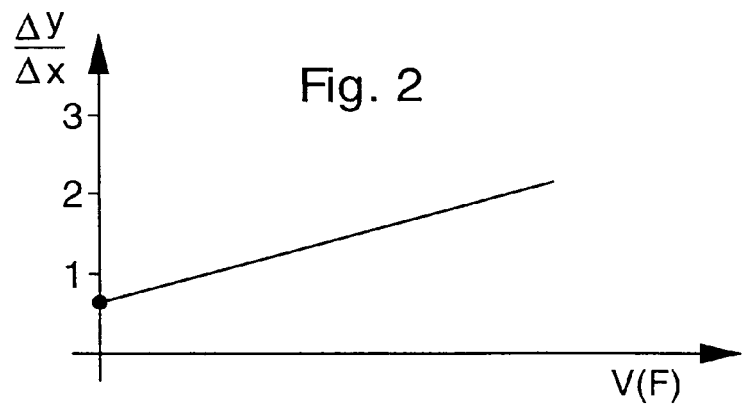
FIGS. 2 and 3 are respectively two graphs showing the movement of the cursor on the screen relative to the movement of the finger on the sensitive zone defined by the touch sensitive sensors.
Figure 3:
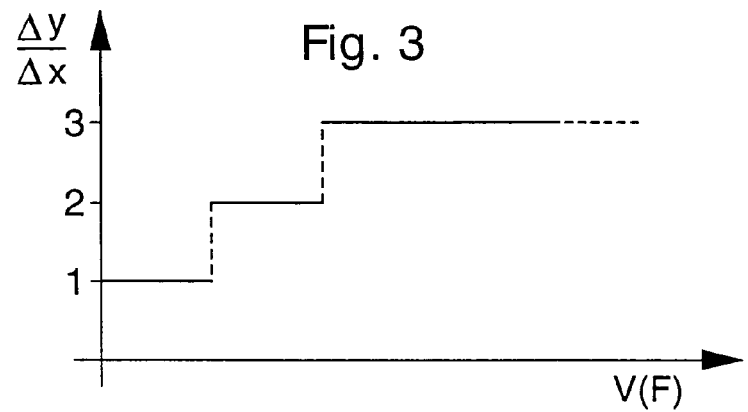

According to an improved cursor control variant, the movement of the cursor on the screen is varied in a non linear manner as a function of the movement of the user's finger over the sensitive zone of the watch. According to a first implementation represented by the graph in FIG. 2, the ratio between movement $\Delta Y$ of the cursor and the path $\Delta X$ taken by the finger over crystal 4 increases as a function of the speed V of movement of the finger over crystal 4 or, similarly, the instantaneous or average frequency F at which the successive actuation of adjacent pads is carried out. In FIG. 2, the variation in the aforementioned ratio is continuous as a function of V(F). In a second implementation represented by the graph of FIG. 3, the aforementioned ratio is in steps. At low speed, a ratio of 1 is provided. For an average speed a ratio 2 is provided, while for a high speed the ratio is equal to 3. Of course, these values are given by way of non limiting example. As is clear from FIG. 2, it is possible for the ratio to be less than 1 for low speeds. This improvement allows large movements to be made with relative precision when the cursor is far from the target object. Conversely, when the cursor has to be moved precisely over a minimum distance, the present solution allows a small precise movement of the cursor to be made corresponding to the movement of the finger in the general plane by crystal 4.

Push-button 14 is provided in particular in order to perform the click or double click suited to the operation of a computer mouse. The means for detecting the speed of the finger movement or the actuation frequency of the successive sensor may be imagined by those skilled in the art without any major difficulty. In a conventional manner, push-button 14 is associated with an electric contactor arranged in case 2. According to another embodiment, the click function is performed by means of a contactor whose actuation element is located in the top portion of case 2, particularly in the 6 o'clock region. By way of variant, this contactor may be replaced by a pressure sensor or a touch sensitive sensor arranged in this same region. Such embodiments are particularly advantageous because they allow the cursor movement to be controlled using the index or middle finger and the click function to be performed using the thumb of the same hand.

Figure 4:
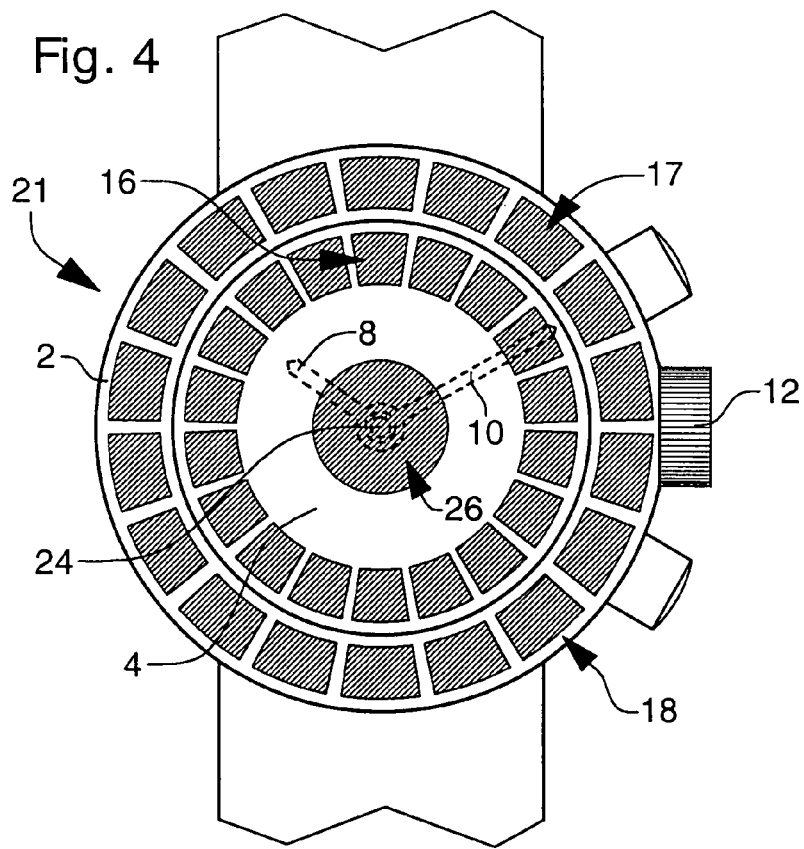
FIG. 4 is a schematic top view of a second embodiment of the invention.

With reference to FIG. 4, a second embodiment will be described. The references already described above will not be described again in detail. Watch 21 includes touch sensitive sensors whose sensitive pads 16 of one part are located substantially in the peripheral region of crystal 4 and the second part of sensitive pads 17 are arranged on the top portion of case 2. Sensitive pads 16 and 17 form respectively two concentric touch-sensitive zones. In each of these zones, the sensitive pads are arranged in a circle and define relative to centre 24 of these zones, identical to the axis of hands 8 and 10, a variable angular direction. According to this second embodiment, the direction of movement of the computer cursor is determined by the orientation of the sensitive pad 16, 17, respectively the sensitive pads 16 and/or 17 actuated by the user's finger relative to centre 24. Further, the speed of the cursor's movement depends on the sensitive zone actuated or two adjacent simultaneously actuated sensitive zones. In the example of FIG. 4, three different movement speeds can thus be defined, namely, a first speed when only the inner annular zone is actuated, a second speed when the outer annular zone is actuated and a third intermediate speed when the two sensitive zones 16 and 17 are simultaneously actuated. This embodiment is advantageous because the two concentric sensitive zones are materially and visually separated from each other, the inner zone being supported by crystal 4 while the outer zone is supported by top portion 18 of case 2 surrounding the crystal. According to a variant shown in FIG. 4, the click function is performed by means of a capacitive sensor 26 supported by crystal 4 and located in the central region thereof. This allows the click function to be performed rapidly using the finger which is also actuating sensitive pads 16 and/or 17. Of course, in order to move the cursor while keeping sensor 26 in an activated state, it is possible to use two fingers. It will be noted here by way of variant that the click function may, in an alternative embodiment, be performed using a push-button as in the case of FIG. 1.

Figure 5:
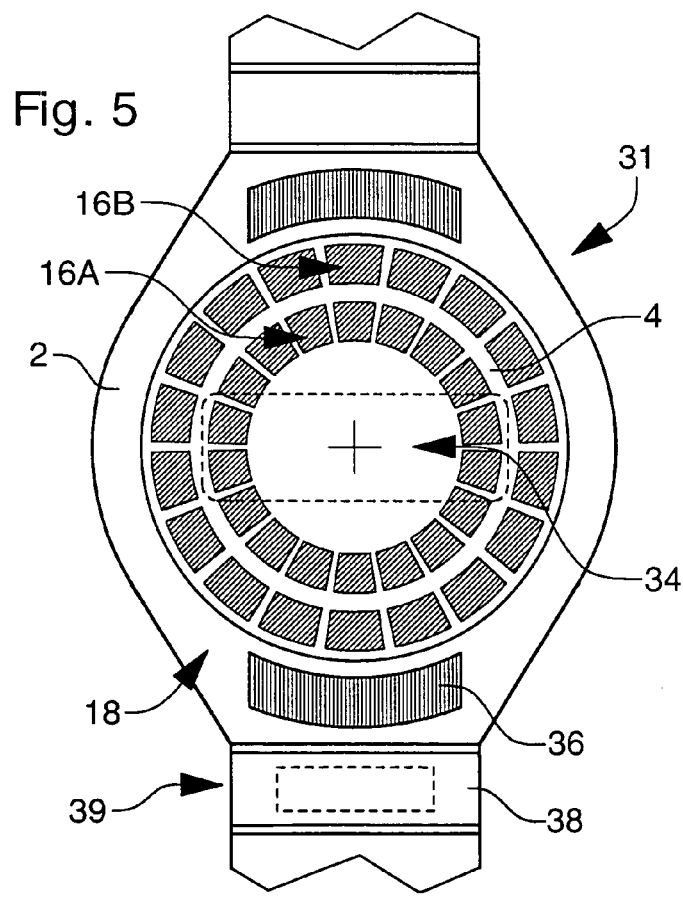
FIG. 5 is a schematic top view of a third embodiment of the invention.

In a similar manner to the second embodiment described above, the touch sensitive sensors are arranged in the shape of concentric circular zones in the third embodiment of FIG. 5. A part of sensitive pads 16A of these touch sensitive sensors define an inner zone while the sensitive pads 16B of the other part define an outer sensitive zone. However, in the present case, the set of sensitive pads is supported by crystal 4 which is at least partially transparent. A digital display is provided for the time and possibly other data, in particular in zone 34. Since the display itself is not the object of the present invention, this aspect is shown in an entirely schematic way. Crystal 4 may cover the LCD display cell or form a top outer portion of the cell. The control of the cursor's movement is similar to that of the second embodiment. In order to allow the two touch-sensitive zones to be identified, it is possible to provide visual means, in particular a design defining these two concentric zones.

The click function is performed using a member 36 located in a 6 o'clock position and associated with a contactor or switch. By way of variant, member 36 may be associated with a pressure sensor.

According to an alternative embodiment which may also apply to the other embodiments described above, the click function may be achieved by means of a touch sensitive sensor, a pressure sensor or a push-button associated with a contactor arranged in a link 38 of watch wristband 39.

Figure 6:
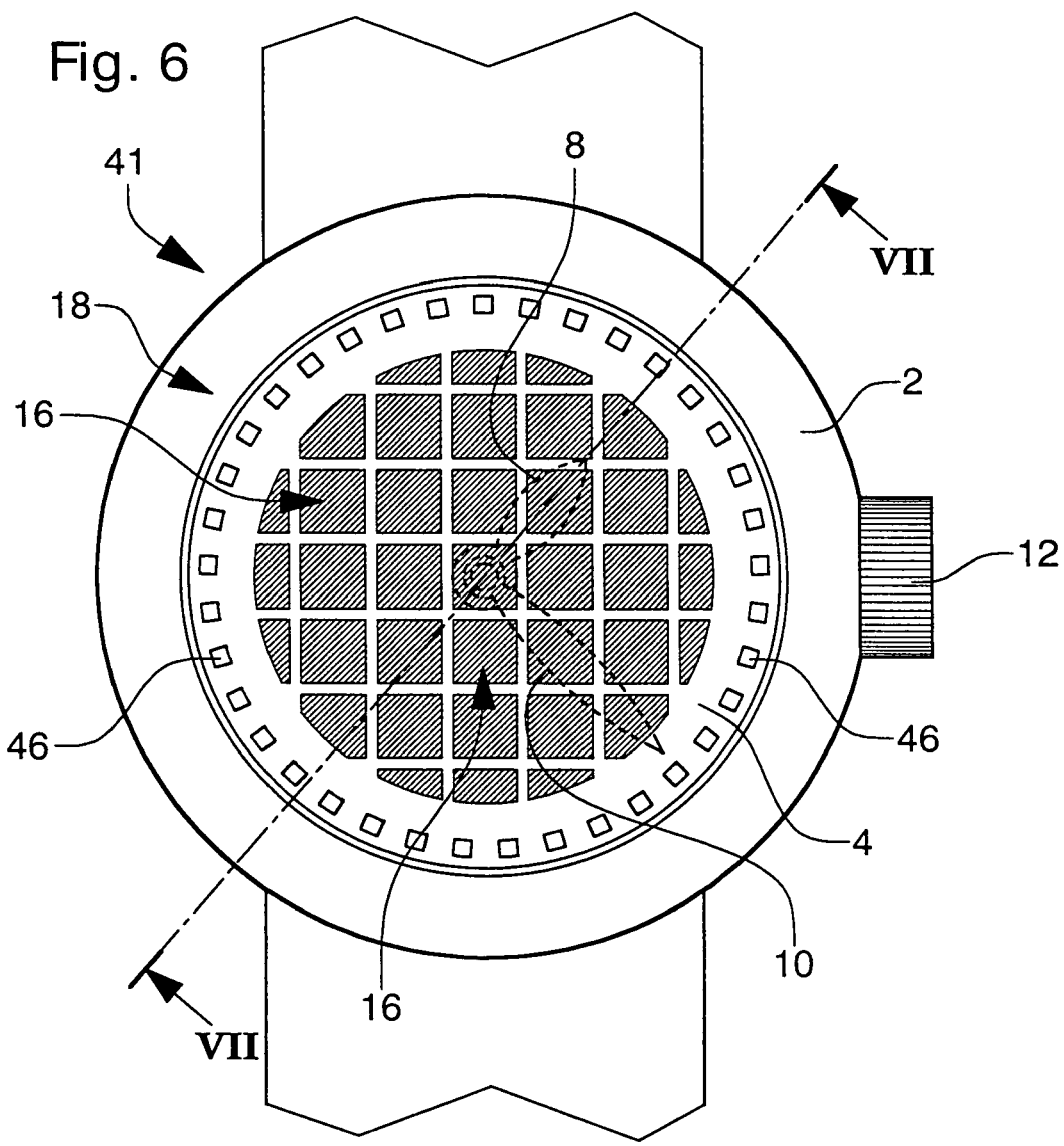
FIG. 6 is a schematic top view of a fourth embodiment of the invention.
Figure 7:
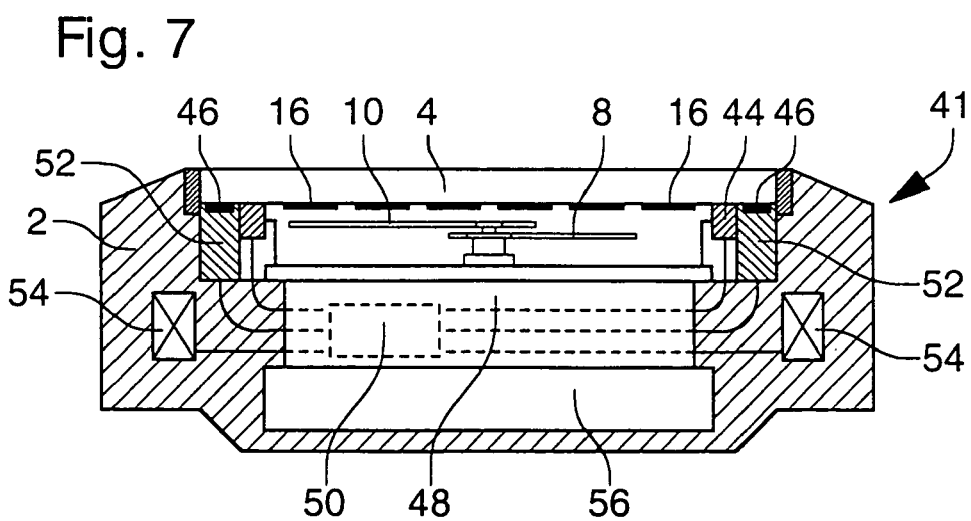
FIG. 7 is a cross-section of FIG. 6 along the line VII-VII.

FIGS. 6 and 7 show schematically a fourth embodiment of a watch according to the invention. The references already described in FIG. 1 will not be mentioned in detail again here. The cursor movement control means are similar to the first embodiment. The touch-sensitive zone is located on crystal 4. This fourth embodiment is essentially distinguished by the means allowing the click function to be performed. These means are formed by crystal 4 associated with a pressure sensor, in particular a piezoelectric crystal 44 arranged under crystal 4 in its peripheral region. The click function is performed by applying pressure onto crystal 4.

Sensitive pads 16 are formed by a transparent material and are electrically connected to contact pads 46 located in the peripheral region of crystal 4. These pads 46 are electrically connected to electronic movement 48 and more particularly to electronic processing unit 50 for the electric signals provided by the touch sensitive sensors. This electric connection is achieved using a Zebra® type connector 52 having conducting sections placed facing pads 46, these conducting sections being separated by insulating sections. Such elastomeric connectors are known to those skilled in the art.

Electronic unit 50 is electrically connected to antenna 54 which has contactless communication with a reader or receiver provided in the computer or as a peripheral unit thereof. A battery or rechargeable accumulator 56 is provided as electric power source. It will be noted that the rechargeable accumulator may advantageously be associated with an electric generator integrated in watch 41 and mechanically coupled to an oscillating mass, this system being known to those skilled in the art.

Thus, in this last embodiment, all the functions relating to the control of a computer cursor are associated with crystal 4. The click and double click functions are performed respectively by one application of pressure and two successive applications of pressure on crystal 4. It will also be noted that piezoelectric sensor 44 may have an annular shape or be formed of several segments arranged in a circle. Likewise, connector 52 may be annular or be formed by several segments. In one particular embodiment, the segments forming sensor 44 and the segments forming connector 52 are arranged in a circle in alternance so as to limit the peripheral surface of crystal 4 necessary for the pressure sensor and the electric connector. The pressure sensor may also be formed by piezo-resistive elements or by micro-contactors in another embodiment.

Finally, it will be noted that crystal 4 may have any shape and may, in particular, be substantially square or rectangular.

In sum, and broadly stated, the present invention, as described above, pertains to a watch (1) including time display means (8; 10) covered by a crystal (4). This watch includes an interface device for controlling a computer cursor. It forms a contactless watch-mouse. For this purpose, a plurality of touch sensitive sensors is arranged so that their sensitive pads (16) are supported at least partially by the crystal (4). The sensitive pads are arranged, in particular, in the shape of a matrix extending over most of the crystal (4), although the shape of the matrix is not limited. The click function is performed using a push-button (14) associated with an electric contactor or by a pressure sensor or by a touch sensitive sensor provided for this purpose.

What is claimed is:

1. A watch including;
   (a) display means for at least one item of time related data and having an at least partially transparent outer element covering said display means or forming an outer portion of the display means;
   (b) first control means for controlling movement of a cursor on a computer screen, wherein said first control means is formed of a plurality of touch sensitive sensors with each touch sensitive sensor having a touch sensitive pad that is at least partially transparent, and the touch sensitive pads are supported at least partially by said outer element so that the display means is at least partially visible through the touch sensitive pads and the outer element, wherein the touch sensitive sensors are of the capacitive type and the sensitive pads are formed by electrodes deposited underneath the outer element; and
   (c) a means for detecting that comprises an electronic processing unit operably connected to receive signals from the touch sensitive sensors and to detect the speed of a user's finger over said outer element or the actuation frequency of successive touch sensitive sensors.

2. The watch according to claim 1, wherein said display means include an analogue display protected by said outer element that defines the watch crystal, wherein said sensitive pads are at least partially superposed with said analogue display.

3. The watch according to claim 2, wherein said sensitive pads of said touch sensitive sensors forming said first means are supported by said outer element.

4. The watch according to claim 2, wherein a part of said sensitive pads of said touch sensitive sensors is arranged in a top portion of a case of the watch surrounding said outer element.

5. The watch according to claim 1, wherein said sensitive pads of said touch sensitive sensors forming said first means are supported by said outer element.

6. The watch according to claim 1, wherein a part of said sensitive pads of said touch sensitive sensors is arranged in a top portion of a case of the watch surrounding said outer element.

7. The watch according to claim 1, wherein said sensitive pads of said plurality of touch sensitive sensors are arranged in the shape of a matrix defining lines and columns that extend over most of said outer element.

8. The watch according to claim 1, wherein the ratio between the movement of said cursor and the path taken by a user's finger across said outer element is less at low speed or actuation frequency than at relatively high speed or actuation frequency.

9. The watch according to claim 7, wherein the movement of said cursor over said computer screen substantially corresponds to the path taken by the user's finger over said outer element.

10. A watch including
    (a) display means for at least one item of time related data and having an at least partially transparent outer element covering said display means or forming an outer portion of the display means; and
    (b) first control means for controlling movement of a cursor on a computer screen, wherein said first control means is formed of a plurality of touch sensitive sensors with each touch sensitive sensor having a touch sensitive pad that is at least partially transparent and the touch sensitive pads are supported at least partially by said outer element so that the display means is at least partially visible through the touch sensitive pads and the outer element, wherein the touch sensitive sensors are of the capacitive type and the sensitive pads are formed by electrodes deposited underneath the outer element, wherein the sensitive pads are arranged in concentric zones, and the direction of movement of said cursor is determined by the orientation of the pad or pads actuated relative to the center of said concentric zones, and wherein the speed of movement of said cursor depends on the concentric zone actuated or on two adjacent concentric zones that are actuated simultaneously.

11. The watch according to claim 1, further including;
    (d) second control means for selecting an object shown on said computer screen or carrying out a command relating to said object.

12. The watch according to claim 11, wherein said second control means are arranged in a top portion of a case of the watch, substantially in the 6 o'clock position.

13. A watch including:
(a) display means for at least one item of time related data and having an at least partially transparent outer element covering said display means or forming an outer portion of the display means;
(b) first control means for controlling the movement of a cursor on a computer screen, wherein said first control means is formed of a plurality of touch sensitive sensors with each touch sensitive sensor having a touch sensitive pad that is at least partially transparent, and the touch sensitive pads are supported at least partially by said outer element so that the display means is at least partially visible through the touch sensitive pads and the outer element, wherein the touch sensitive sensors are of the capacitive type and the sensitive pads are formed by electrodes deposited underneath the outer element; and
(c) second control means for selecting an object shown on said computer screen or carrying out a command relating to said object, wherein said second control means is also formed by a touch sensitive sensor that is a capacitive sensor supported by the outer element and located in a central region of the outer element.

14. The watch according to claim 11, wherein said second control means is formed by a push-button associated with an electric contactor.

15. The watch according to claim 11, wherein said second control means is arranged in a link of the wristband of the watch or in a portion of the wristband of the watch.

16. The watch according to claim 11, wherein said second control means is formed by said outer element associated with a pressure sensor, wherein selection of said object or said command relating to said object is performed by applying pressure onto said outer element.

17. The watch according to claim 16, wherein said pressure sensor is formed by a piezoelectric crystal arranged on the periphery of said outer element.

18. The watch according to claim 11, wherein said second control means is formed by said outer element associated with at least one micro-contactor or small travel contactor.

19. A watch including:
(a) display means for at least one item of time related data and having an at least partially transparent outer element covering said display means or forming an outer portion of the display means;
(b) first control means for controlling movement of a cursor on a computer screen, wherein said first control means is formed of a plurality of touch sensitive sensors with each touch sensitive sensor having a touch sensitive pad that is at least partially transparent, and the touch sensitive pads are supported at least partially by said outer element so that the display means is at least partially visible through the touch sensitive pads and the outer element, wherein the touch sensitive sensors are of the capacitive type and the sensitive pads are formed by electrodes deposited underneath the outer element; and
(c) a detector that detects the speed of a user's finger over said outer element or the actuation frequency of successive sensors.

* * * * *